US009056768B2

(12) United States Patent
Langan (10) Patent No.: US 9,056,768 B2
(45) Date of Patent: Jun. 16, 2015

(54) HYDROGEN GENERATOR AND FUEL CARTRIDGE

(71) Applicant: Intelligent Energy, Inc., San Jose, CA (US)

(72) Inventor: Richard A. Langan, Parma, OH (US)

(73) Assignee: Intelligent Energy Inc., San Jose, CA (US)

(*) Notice: Subject to any disclaimer, the term of this patent is extended or adjusted under 35 U.S.C. 154(b) by 340 days.

(21) Appl. No.: 13/678,614

(22) Filed: Nov. 16, 2012

(65) Prior Publication Data
US 2014/0140919 A1 May 22, 2014

(51) Int. Cl.
C01B 3/36 (2006.01)
C01B 3/02 (2006.01)
B01J 7/00 (2006.01)
C01B 3/04 (2006.01)

(52) U.S. Cl.
CPC ... *C01B 3/02* (2013.01); *B01J 7/00* (2013.01); *C01B 3/04* (2013.01); *Y02E 60/364* (2013.01)

(58) Field of Classification Search
CPC ............... Y02E 60/362; Y02E 60/364; H01M 2250/30; H01M 8/04216; C01B 3/065
See application file for complete search history.

(56) References Cited

U.S. PATENT DOCUMENTS

| 6,544,400 | B2 | 4/2003 | Hockaday et al. |
| 6,838,209 | B2 | 1/2005 | Langan et al. |
| 6,955,863 | B2 | 10/2005 | Bean et al. |
| 7,820,312 | B2 | 10/2010 | Eickhoff |
| 2001/0045364 | A1* | 11/2001 | Hockaday et al. ............ 205/338 |
| 2004/0126643 | A1* | 7/2004 | Kinkelaar et al. ............. 429/34 |
| 2007/0298306 | A1 | 12/2007 | Finkelshtain et al. |
| 2008/0274384 | A1* | 11/2008 | Finkelshtain et al. .......... 429/19 |
| 2009/0136796 | A1* | 5/2009 | Finkelshtain et al. .......... 429/14 |
| 2009/0304558 | A1* | 12/2009 | Patton et al. ................. 422/148 |
| 2010/0104481 | A1* | 4/2010 | Curello et al. ................ 422/112 |

(Continued)

FOREIGN PATENT DOCUMENTS

| EP | 1367025 A1 | 12/2003 |
| JP | 2008254967 A | 10/2008 |
| JP | 2011140420 A | 7/2011 |
| WO | 2009086541 A1 | 7/2009 |

OTHER PUBLICATIONS

U.S. Appl. No. 13/943,945, filed Jul. 17, 2013, Fuel Unit, Refillable Hydrogen Generator and Fuel Cell System.

(Continued)

*Primary Examiner* — Imran Akram
(74) *Attorney, Agent, or Firm* — Baker & Hostetler LLP (57) ABSTRACT

A fuel cartridge and a hydrogen generator are provided for supplying hydrogen gas to a hydrogen gas device. The fuel cartridge includes a fuel composition disposed in a container and a multi-layer package material, such as a laminate, enclosing the fuel composition therein. The laminate includes a polymer layer distal the fuel composition and a conductor layer proximate the fuel composition and including a preformed portion. The hydrogen generator includes a punch thermally coupled to a heater assembly and is configured to move between a retracted state and a puncture state. When the fuel cartridge is disposed in the hydrogen generating apparatus, the punch is configured to puncture the polymer layer and bring the coined portion into contact with the fuel composition. Heat is applied to a hydrogen containing material in the fuel composition through the punch and preformed portion to release hydrogen gas.

6 Claims, 8 Drawing Sheets

(56) References Cited

U.S. PATENT DOCUMENTS

| | | |
|---|---|---|
| 2011/0176973 A1* | 7/2011 | Rosenzweig et al. ......... 422/242 |
| 2011/0177404 A1 | 7/2011 | Hung et al. |
| 2011/0177405 A1 | 7/2011 | Hung et al. |
| 2011/0207027 A1 | 8/2011 | Kim et al. |
| 2012/0156103 A1 | 6/2012 | Lin et al. |

OTHER PUBLICATIONS

PCT Pat. App. No. PCT/US13/044906, filed Jun. 10, 2013, Method of Making a Packaged Fuel Unit for a Hydrogen Generator.

International Search Report for corresponding International Application No. PCT/US2013/05104.

* cited by examiner

HYDROGEN GENERATOR AND FUEL CARTRIDGE

TECHNICAL FIELD

The present application relates generally to a fuel source for a fuel cell, and more particularly to a hydrogen generator and fuel cartridge.

BACKGROUND

Interest in hydrogen fuel cells as power sources is continuing to grow. Exemplary hydrogen fuel cells include proton exchange membrane fuel cell (PEMFC), alkaline fuel cell (AFC), phosphoric-acid fuel cell (PAFC), solid oxide fuel cell (SOFC) and molten carbonate fuel cell (MCFC). Each of these hydrogen fuel cell can use hydrogen and oxygen as the active materials of the fuel cell negative electrode (anode) and positive electrode (cathode), respectively. Hydrogen is oxidized at the negative electrode, and oxygen is reduced at the positive electrode. Ions pass through an electrically nonconductive, ion permeable separator and electrons pass through an external circuit to provide an electric current.

Some hydrogen fuel cells utilize an external fuel source that supplies hydrogen to the fuel cell. Hydrogen generators show promise as suitable external fuel sources for hydrogen fuel cells. But the efficiency of hydrogen generators is an issue.

SUMMARY

The present disclosure provides a fuel cartridge and a hydrogen generator for supplying hydrogen gas to a hydrogen gas device. The fuel cartridge includes a fuel composition disposed in a container, and a multi-layer package material enclosing the fuel composition therein. The fuel composition includes a hydrogen containing material that can release hydrogen gas when heated. The multi-layer package material includes a polymer layer distal the fuel composition and a conductor layer proximate the fuel composition and including a preformed portion. The hydrogen generator includes a punch thermally coupled to a heater assembly and is configured to move between a retracted state and a puncture state. When the fuel cartridge is disposed in the hydrogen generating apparatus, the punch is configured to puncture the polymer layer and bring the preformed portion into contact with the fuel composition. Heat is applied to the fuel composition through the punch and coined portion to heat the hydrogen containing material and release hydrogen gas. The fuel cartridge and hydrogen generator of the present disclosure provide improvements in the efficiency and recyclability of the fuel cartridge.

In accordance with one aspect of the present disclosure, a fuel cartridge includes a container defining an interior volume and including an open portion; a fuel composition disposed within the interior volume of the container, the fuel composition including a hydrogen containing material configured to release hydrogen gas when heated; a multi-layer package material at the open portion of the container and enclosing the fuel composition within the interior volume of the container, the multi-layer package material including: a conductor layer proximate the fuel composition, at least a portion of the conductor layer being a preformed portion; and a polymer layer distal the fuel composition. Embodiments may include one or more of the following features:

the preformed portion is a coined or machined portion of the conductor layer;

the preformed portion or multiple preformed portions are the entire portion of the conductor layer may;

the conductor layer includes at least one of aluminum, copper, stainless steel, steel, or nickel;

the polymer layer includes polyether ether keytone;

the multi-layer package material is configured such that when a punch is pressed against the portion of the multi-layer package material proximate the preformed portion, the polymer layer is punctured and the preformed portion of the conductor layer is brought into contact with the fuel composition;

the preformed portion is adjacent a center of a surface of the fuel composition;

the fuel composition includes multiple segregated portions disposed within the interior volume of the container, and the conductor layer includes multiple preformed portions, each preformed portion adjacent a respective segregated portion of the fuel composition; and the fuel composition includes multiple segregated portions disposed within the interior volume of the container, and the conductor layer includes multiple conductor portions, each conductor portion adjacent a respective segregated portion of the fuel composition, and each conductor portion may include a preformed portion.

In accordance with another aspect of the present disclosure, a hydrogen generator includes a housing; a holder disposed within the housing and configured to retain a fuel cartridge; a heater assembly disposed within the housing; and a punch disposed within the housing and thermally coupled to the heater assembly, the punch configured to move between a retracted state and a puncture state. Embodiments may include one or more of the following features:

the hydrogen generator further includes a biasing member mechanically coupled to the punch and configured to move the punch from the retracted state to the puncture state;

in the puncture state, the punch is configured to press against a multi-layer package material of the fuel cartridge retained by the holder, puncture a polymer layer of the multi-layer package material, and move a preformed portion of the multi-layer package material into contact with a fuel composition within the fuel cartridge;

the punch includes at least one of a bullnose shape, a tapered shape, a pointed shape, or a multi-pointed shape;

the hydrogen generator includes multiple punches, each punch thermally connected to the heater assembly and adjacent a respective segregated portion of a fuel composition within the fuel cartridge when the fuel cartridge is retained by the holder; and the fuel cartridge is a fuel cartridge as described above.

In accordance with another aspect of the present application, a method of generating hydrogen gas includes inserting a fuel cartridge into a hydrogen generator, the hydrogen generator including a housing that houses a holder configured to retain the fuel cartridge, a heater assembly, and a punch thermally coupled to the heater assembly, and the fuel cartridge including: a container defining an interior volume and including an open portion; a fuel composition disposed within the interior volume of the container, the fuel composition including a hydrogen containing material configured to release hydrogen gas when heated; and a multi-layer package material at the open portion of the container and enclosing the fuel composition within the interior volume of the container; puncturing the laminate by moving the punch from a retracted state to a puncture state, wherein the puncture state of the punch provides a heat conductive path from the heat source to the surface of the fuel composition through the punch; and applying heat to the fuel composition through the punch to release hydrogen gas. Embodiments may include one or more of the following features:

the multi-layer package material includes: a conductor layer proximate the fuel composition, a portion of the conductor layer being a preformed portion; and a polymer layer distal the fuel composition.

the step of puncturing the multi-layer package material includes puncturing the polymer layer, separating the preformed portion of the conductor layer from the remainder of the conductor layer, and bringing the preformed portion of the conductor layer into contact with the fuel composition;

the step of puncturing the multi-layer package material includes puncturing the polymer layer and bringing the preformed portion of the conductor layer into contact with the fuel composition;

the conductor layer includes at least one of aluminum, copper, stainless steel, steel, or nickel; and the polymer layer may include polyether ether keytone; and the fuel composition includes multiple segregated portions disposed within the interior volume of the container, the conductor layer may include multiple preformed portions, each preformed portion adjacent a respective segregated portion of the fuel composition, and the hydrogen generator includes multiple punches, each punch arranged so as to be adjacent a respective segregated portion of a fuel composition within the fuel cartridge when the fuel cartridge is retained by the holder, and the step of puncturing the laminate includes controlling one of the multiple punches to puncture one of the respective preformed portions.

The foregoing and other features of the invention are hereinafter described in greater detail with reference to the accompanying drawings.

DETAILED DESCRIPTION

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments.

The principles of the present application have particular application to a fuel source for a fuel cell, and thus will be described below chiefly in this context. It will of course be appreciated, and also understood, that the principles of the present disclosure may be useful for other applications where the generation of hydrogen is desired, such as other hydrogen consuming devices or appliances.

A fuel source can include a hydrogen generator and one or more fuel cartridges that can be used to provide hydrogen gas to a device such as a fuel cell battery or another hydrogen consuming device or appliance. The fuel cartridge(s) can be removably inserted into the hydrogen generator, allowing reuse of the hydrogen generator and replacement of spent fuel cartridges by the user of the hydrogen generator.

The fuel cartridge includes a container that defines an interior volume having one or more compartments within which a fuel composition is contained. The container may be made from any suitable material having sufficient strength and chemical and thermal stability. In some embodiments, the container may be made from one or more high temperature plastics or thermosets, such as KAPTON® (from DuPont) and/or polyether ether ketone (PEEK) polymers. In other embodiments, the container may be made from a metal or metal alloy, such as aluminum, nickel, copper and/or steel.

The fuel composition includes one or more hydrogen containing materials that can release hydrogen gas (e.g., via a thermal decomposition reaction) when heated. Reactants that can undergo thermal decomposition reactions to produce hydrogen gas are desirable because they generally produce a relatively high volume of hydrogen gas on a volumetric basis.

The fuel composition may include at least one hydrogen containing material. In some embodiments, more than one hydrogen containing material can be included. Examples of hydrogen containing materials that can evolve hydrogen gas when heated include: materials that can reversibly absorb and desorb hydrogen (e.g., metal-organic frameworks (MOFs), zeolites, graphene, carbon nanotubes and metal hydrides as $AB_5$ and $AB_2$ type hydrogen storage alloys such as titanium-manganese, mischmetal-nickel, lanthanum-nickel-cobalt and lanthanum-nickel alloys), materials that can react to produce hydrogen gas upon thermal decomposition (e.g., metal hydrides such as lithium hydride, magnesium hydride, and aluminum hydride (alane), complex hydrides and their ammonia adducts such as lithium borohydride, sodium borohydride, magnesium borohydride, calcium borohydride, ammine titanium (III) borohydride, lithium aluminum hydride, sodium aluminum hydride, lithium amide, and calcium aluminum hydride, and B—N chemical hydrides such ammonia borane and hydrazine borane), and various combinations including the above materials. One or more suitable hydrogen containing materials may be chosen based on factors such as the physical and/or chemical properties of the hydrogen containing material(s), the temperature range for the desired release of hydrogen gas, whether the release of hydrogen gas is exothermic or endothermic, the long-term stability of the hydrogen containing material, form and properties of byproducts, and so on.

In some embodiments, the fuel composition is a high density solid, but the fuel composition may be in any suitable form, such as in powdered or granular form (e.g., contained in one or more compartments), or formed into solid bodies such as pellets, pills, tablets, wafers or cakes (e.g., by compressing, molding extruding depositing, coating roll coating, printing, and so on).

The fuel composition may additionally include one or more additives. Examples of additives include binders (e.g., acrylates and styrene block copolymers), stabilizing compounds (e.g., solid bases), thermally conductive materials (e.g., metals, graphites and combinations and composites thereof), ignition materials (as described below), thermally conductive coatings or layers, thermally insulating coatings or layers, and so on. Such additives can be an ingredient of the fuel composition and/or can be a separate from the fuel composition.

In some embodiments, the fuel composition may include an ignition material. An ignition material may be included in embodiments where the resultant release of hydrogen gas from the reaction composition is not sufficiently exothermic for the release of hydrogen gas to be self sustaining (i.e., endothermic as used herein). The ignition material reacts exothermically when heated and the reaction is self sustaining so the ignition material can be used (in conjunction with the heater assembly of the hydrogen generating apparatus) to provide heat to initiate the release of hydrogen gas from the endothermic hydrogen containing material. The ignition material may provide a number of advantages. For example, the temperature to which the ignition material must be heated to react may be lower than the minimum temperature required to cause the release of hydrogen gas from the hydrogen containing material, reducing the heat producing requirement for the heater assembly of the hydrogen generating apparatus. Furthermore, some types of ignition materials will also generate hydrogen gas when they react, contributing to the total amount of hydrogen the hydrogen generator can provide. Examples of ignition materials include metal/metal oxide multilayers such as $Ti/Pb_3O_4$, $Zr/Fe_2O_3$, guanidinium borohydride, B—N compounds blended with oxidizers such as ammonium nitrate or $Sr(NO_3)_2$ as described in US2011/0027168A1, metal/metal multilayered thin films and structures such as Ni/Al as described in U.S. Pat. No. 7,867,441, autoignition compositions such as silver nitrate mixed with potassium nitrate and molybdenum metal as described in U.S. Pat. No. 6,749,702, complex hydride, oxidizer, and S compositions such as described in U.S. Pat. No. 7,964,111, and the compositions described in patents US2008/0236032A1 and US 2008/0241613A1. Other compositions include gels of metals and water such as Mg/water/poly(acrylamide-co-acrylic acid) alone or in combination with sodium borohydride (Varma, et al. *Chem. Eng. Sci* 2010, 65, 80-87 and *Int. J. Hydrogen En* 2007, 32, 207-211, respectively).

The ignition material can be disposed within or in contact with the fuel composition. For example, the ignition material can be an ingredient of the fuel composition and/or the ignition material can be a separate from the fuel composition. In embodiments where the ignition material is separate from the fuel composition, layers containing ignition material can be alternated with portions containing the fuel composition. In other embodiments, the ignition material can be proximate a surface of the fuel composition to facilitate initiation by the heater element of the hydrogen generating apparatus.

In some embodiments the fuel composition is segregated, such as into individual pellets or multiple compartments. Segregation of the fuel composition allows for the amount of hydrogen containing material that is heated to be limited to a portion of the total fuel composition contained within the fuel cartridge. Segregated quantities of the fuel composition can be sized and shaped to produce a desired amount of hydrogen gas, fit within the fuel unit in a volume efficient manner, prevent cross-initiation of adjacent quantities of the fuel composition, and so on. The segregated quantities of the fuel composition may be separated from one another in various ways, such as by containment in individual compartments and/or being spaced apart by gaps, coatings, thermal insulation and the like. It will be understood that, in other embodiments, the container may have a single, non-segregated quantity of reactant composition.

The fuel cartridge may include a hydrogen gas outlet that can allow the hydrogen gas released as a result of heating the hydrogen containing material to be removed from the container (e.g., for being supplied to the fuel cell). The fuel cartridge may additionally include a filter at the outlet to prevent fuel composition or byproducts from escaping the cartridge. In some embodiments, the fuel cartridge may further include a check valve in fluid communication with the hydrogen gas outlet to prevent the fuel composition from being exposed to the environment (e.g., oxygen and moisture), while allowing the generated hydrogen to escape through the cartridge.

The fuel cartridge can include a thermal insulation layer near or as part of the container to protect the user when a used fuel unit is removed from the hydrogen generator. The thermal insulation layer can surround the side and base surfaces of the container, but leaving a portion of the container open, or the thermal insulation layer may also surround a portion of the open portion. Examples of materials that may be suitable as thermal insulation include silica, silicon dioxide, silicon nitrides, silicon carbide, silica aerogel, alumina, aluminum oxide, glass, glass wool, mineral wool, cellular glass, perlite, and polymers such as polyimides and epoxy-amine composites.

The fuel composition may be placed in the interior volume of the cartridge through the open portion of the container. The open portion of the container is covered to retain the fuel composition therein, optionally seal the container in order to protect the fuel composition from exposure to the environment (e.g., from oxygen and moisture), provide heat conductive path for heating the fuel composition. In one embodiment the covering is a multi-layer package material that includes a substrate layer and a conductor layer. The multi-layer package material can be a laminate material or a material including multiple layers that are not laminated. As used below, the term "laminate" can include both laminated and non-laminated multiple layers.

The substrate layer may be made of an electrically nonconductive material. In some embodiments, the substrate layer has a thermal conductivity less than about 10 watts/meter·Kelvin. In other embodiments, the substrate layer has a thermal conductivity less than about 5 watts/meter·Kelvin. In still other embodiments, the substrate layer has a thermal conductivity less than about 2 watts/meter·Kelvin. In yet other embodiments, the substrate layer has a thermal conductivity less than about 1 watts/meter·Kelvin). As used herein, an electrically nonconductive material has an electrical resistivity more than $1\times10^{16}$ ohm·m at 20° C.

The substrate layer should be stable at the expected operating temperature of the hydrogen generator (e.g., up to at least 250° C.). For example, the substrate layer may be made from at least one high temperature polymer. As used herein, "high temperature polymer" means having a heat distortion temperature (deflection temperature under load) (per ASTM D648 at 18.56 $kg/cm^2$ (264 psi)) greater than the maximum temperature which the laminate is designed to withstand (e.g., preferably a heat distortion temperature of at least 250° C.). The high temperature polymer(s) may be a polymer selected from polyetheretherketone (PEEK), polyimides, phenolics, and derivatives thereof. In some embodiments, the substrate layer is made from PEEK. Various types and grades of PEEK are commercially available. For example, Victrex Manufacturing Limited provides PEEK films ranging in thickness from about 6 μm to about 750 μm and widths of up to 1450 mm. VICTREX® APTIV™ PEEK™ 1100 series grades are mineral filled (reinforced), and VICTREX® APTIV™ PEEK™ 1000 series grades are not reinforced. In some embodiments, the thickness of the substrate layer 122 may be about 0.100 mm or greater to about 0.150 mm or less.

The conductor layer may be made of an electrically conductive material. In some embodiments, the conductor layer has a thermal conductivity greater than 10 watts/meter·Kelvin. In other embodiments, the conductor layer has a thermal conductivity greater than 100 watts/meter·Kelvin). As used herein, an electrically conductive material has an electrical resistivity less than $1 \times 10^{-5}$ ohm·m at 20° C.

The conductor layer should be stable at the expected operating temperature of the hydrogen generator (e.g., up to at least 250° C.). The conductor layer may be made from a material selected from metals, metal alloys and conductive non-metallic materials. A suitable metal can be one of aluminum, steel, stainless steel, copper and nickel, a combination or an alloy thereof, for example. The conductive non-metallic material can be a graphite based material (e.g., GRAFOIL®, made by GrafTech). In some embodiments, the thickness of the conductor layer 124 may be about 0.025 mm or greater to about 0.050 mm or less.

The conductor layer includes one or more conductor sections. For example, the conductor layer may include an array of conductor sections. The array may include any suitable number and arrangement of conductor sections. For example, the conductor layer may include conductor sections arranged in a single longitudinal row, extending parallel to a longitudinal axis of the substrate layer, or in multiple longitudinal rows. Conductor sections in one longitudinal row may be aligned with conductor sections in one or more other longitudinal rows to form rows such as transverse rows perpendicular to a longitudinal axis of the substrate layer or diagonal rows that are neither parallel to nor perpendicular to a longitudinal axis of the substrate layer. Preferably the conductor sections are generally arranged such that at least one conductor section is aligned with each segmented portion of the fuel composition.

The conductor layer include at least one preformed portion, configured such that it will separate from the remainder of the conductor layer due to a force applied thereto in a direction perpendicular to the major surface of the conductor layer (e.g., a force applied by a punch, as described below). Once disconnected, the preformed portion of the conductor layer may be configured to contact the surface of the fuel composition and conduct heat from a heater assembly of the hydrogen generator to the fuel composition. Such arrangement provides for a point-source heating at the surface of the fuel composition. The preformed portion may be formed by forming areas of reduced material thickness (e.g., by coining), by making cuts in the conductor layer (e.g., by dye cutting, drilling, laser cutting, etc.), or by or otherwise machining the conductor layer.

For embodiments in which the conductor layer includes multiple conductor sections, each conductor section includes a preformed portion, the number and arrangement of which may be dependent on the configuration of the hydrogen forming apparatus to which the fuel cartridge may be inserted.

The preformed portions of the conductor layer may be arranged near the center of the fuel composition surface proximate the conductor layer. It has been found by the inventor that efficient use of the fuel composition occurs when the preformed portion, when in contact with the fuel composition, is located proximate the center of the surface of the fuel composition. Such location allows the heat conducted by the preformed portion to most efficiently spread throughout the extent of the fuel composition (e.g., as opposed to the preformed portion being non-centrally located). In other embodiments in which each conductor portion includes more than one preformed portion, such preformed portions may be arranged in a manner that will maximize the efficiency of the use of the fuel composition.

In another embodiment the conductor layer of the laminate is defined by one or more preformed portions. That is, the entire conductor layer consists of the preformed portion(s). Each preformed portion may be associated with a respective segregated portion of the fuel composition. Each preformed portion may be configured to contact the surface of the fuel composition due to a force applied thereto in a direction perpendicular to the major surface of the conductor layer (e.g., a force applied by a punch, described below), and conduct heat from a heater assembly of the hydrogen generator to the fuel composition, without having to disconnect from a remainder of the conductor layer. Such embodiment can also provide less waste material compared to the embodiment described above.

A gap may be present between the laminate and the fuel composition, to allow for the preformed portion to separate from the remainder of the conductor layer (e.g., when pushed by a punch).

The laminate used to close the container may be formed from a substrate strip and a conductor strip. In some embodiments, one or both of the substrate strip and the conductor strip may be provided in relatively short segments, which may be suitable for feeding from a magazine for example. In such embodiments, the short-segmented substrate strip and/or conductor strip may be provided as a rigid material (e.g., to provide strength or to facilitate feeding of shorter lengths of substrate in sections). In other embodiments, one or both of the strips can be in the form of a roll from which the strip can be fed in a high speed, high volume manufacturing process. In such embodiments, a flexible substrate strip and/or conductor strip may be provided (e.g., to allow feeding).

A roll-to-roll process may be used for making a laminate for use in connection with the fuel cartridge. A substrate strip in roll form may be unwound and fed from a feed reel to a bonder. A conductor strip may be unwound and fed from a feed reel to a machining apparatus, where the conductor strip is machined to produce conductor sections connected to at least a portion of the remainder of the conductor strip. The conductor sections may be formed by making cuts in the conductor strip (e.g., by dye cutting, drilling, laser cutting, etc.) or by forming areas of reduced material thickness in the conductor strip (e.g., by coining). The preformed portion(s) of each conductor strip may also be formed by the machining apparatus by making cuts in the conductor strip (e.g., by dye cutting, drilling, laser cutting, etc.) or by forming areas of reduced material thickness in the conductor strip (e.g., by coining). In other embodiments, the preformed portion(s) may be formed by another machining apparatus at another point in the laminate forming process (e.g., after being fed from the feed reel but prior to being machined by the machining apparatus, after being machined by the machining apparatus but before being bonded to the substrate strip, or after being bonded to the substrate strip). In other embodiments, the process for making the laminate may not include the machining apparatus. In such embodiments, the conductor strip may include a plurality of preformed portions supported by a removable backing. The substrate strip and conductor strip may be aligned with each other, and the conductor sections (or the preformed portions) secured to the substrate strip by a bonder. The conductor sections (or the preformed portions) may be bonded using a suitable method, such as thermal bonding (direct or inductive), adhesive bonding, ultrasonic welding or laser welding. For example, a bonding tool such as a press platen may be used; e.g., to apply heat and/or pressure. Any bonding materials (e.g., hot melt or adhesive materials) used in connection with the bonding process should be chosen to be stable at the expected operating temperature of the hydrogen generator (e.g., to avoid producing gases that could contaminate the hydrogen gas). Silicon based adhesives may be a suitable type of adhesive. The conductor strip (e.g., the portion of the conductor strip that is not the conductor portions, or the releasable backing) may then be separated from the bonded laminate by a web separator and collected in a take-up reel (e.g., for disposal or recycling). The laminate may be collected using a take-up reel. In some embodiments, additional processing may be performed on the laminate between separation from the conductor strip and collection at the take-up reel. For example, the laminate may be pressed or rolled to flatten the conductor portions so there are no protruding edges, or the laminate may be trimmed or cut into narrower strips or shorter segments. Alternatively, the package strip can be fed directly into a subsequent process for assembling the package.

The fuel cartridge may be formed by inserting the fuel composition into the interior volume of the container and sealing the container using the laminate. The laminate may be aligned with the open portion of the container such that the conductor section may be positioned over the fuel composition (or a respective conductor section may be positioned over each segregated quantity of the fuel composition). A segment of the laminate may be used to close or seal the container. Various processes can be used to bond the laminate to the container, such as heat healing, adhesive bonding, ultrasonic welding, laser welding and pressure lamination. The laminate may be secured to the container with a continuous or a discontinuous bond. A continuous bond can provide a seal to prevent the fuel composition disposed in the container from being exposed to the environment (e.g., oxygen and moisture). A discontinuous bond can provide a hydrogen gas outlet (e.g., in addition or as an alternative to the outlet). In some embodiments, the laminate may be cut to an appropriate size prior to bonding to the container. In other embodiments, the laminate may be bonded to multiple interconnected containers, and the containers and laminate may subsequently be cut and separated.

An exemplary hydrogen generator may heat a fuel cartridge placed therein to produce hydrogen gas. The hydrogen gas may be provided to a hydrogen gas device such as a fuel cell battery or a hydrogen consuming device or appliance.

The hydrogen generator includes a holder, which may be configured to receive one or more fuel cartridges. The holder may include features for aligning the each fuel cartridge in a particular orientation. The walls of the holder can include one or more surface features (e.g., indentations or projections) that cooperate with features of the fuel cartridge to permit insertion of the fuel cartridge into the holder in only the desired orientation.

The hydrogen generator includes at least one heater assembly configured to provide heat to the fuel composition of the fuel cartridge to initiate a release of hydrogen gas. In one embodiment, the heater assembly may include at least one resistive electric heating element for converting electric energy to thermal energy. Any suitable resistive heater can be used, such as a resistive heater including metals or alloys such nickel-chromium, iron-chromium-aluminum and copper-nickel. The heater assembly may be coupled to a suitable energy composition, such as a primary battery, a secondary battery, a fuel cell battery, a capacitor, and/or a public utility.

The hydrogen generator includes at least one punch configured to move between a retracted state and a puncture state. The punch may be coupled to a biasing member for moving the punch between states. The biasing member may be any suitable member, such as a spring, an electric motor or actuator (e.g., a solenoid).

The laminate may be punctured by moving the punch from the retracted state to the puncture state. In one embodiment the punch may be configured to puncture the substrate layer, detach the preformed portion from the remainder of the conductor layer, and bring the preformed portion into contact with the surface of the fuel composition. The presence of the preformed portion of the laminate between the punch and the fuel composition helps to keep the punch clean, facilitating reuse of the punch with many fuel cartridges.

Each punch is thermally coupled to the heater assembly (e.g., via the heating element). In the puncture state, a thermally-conductive path is provided from the heater assembly to the fuel composition contained within the fuel cartridge. Heat produced by the heating element is conducted through the punch and preformed portion of the conductor layer, to the surface of the fuel composition. In some embodiments, the punch is thermally coupled to the heater assembly through the biasing member (e.g., through a spring). In other embodiments, the punch is thermally coupled to the heater assembly through a conductive path other than the biasing member.

To initiate the release of hydrogen gas from the hydrogen containing material, heat from external heating elements is conducted into the package. The punctured laminate may not prevent residual hydrogen from escaping therethrough, but may act as a barrier to prevent particulate matter from escaping from the container. This can advantageously keep the fuel cartridge cavity in the hydrogen generator clean and prevent exposure of the user to the contents of the cartridge when it is removed after use. When the outer layer of the fuel cartridge package is punctured, the surrounding edges can also provide some thermal insulation around the punch to maximize heating efficiency and reduce the risk of heating adjacent quantities of fuel in the fuel cartridge.

The punch may be formed from any suitable material, e.g., aluminum, copper, stainless steel, steel, nickel, and the like. The punch may also have any suitable shape for puncturing the substrate layer and detach the preformed portion from the remainder of the conductor layer.

The hydrogen generator may include multiple punches, each punch coupled to the heater assembly. For example, the hydrogen generator may include multiple punches, each punch associated with a respective preformed portion and segregated portion of the fuel composition. Each punch may be coupled to a respective heating element of the heater assembly.

The hydrogen generator may include a controller for controlling the heater assembly and/or the biasing member for moving the punch. The controller may also be coupled to the fuel cell, and may determine the need for hydrogen and/or the required hydrogen flow rate by monitoring the pressure within the fuel cell system, one or more electrical characteristics of the fuel cell battery, or one or more electrical characteristics of the electronic device, for example.

The hydrogen generator includes a housing in which the components of the hydrogen generator are disposed. The housing may be closable (e.g., via a door) to retain the fuel cartridge within the holder, and the housing may be sealable to contain the generated hydrogen gas and exclude gases from the outside environment.

The housing should have sufficient mechanical strength and resistance to the environment to which the hydrogen generator is expected to be exposed, particularly to high temperatures and reactants and byproducts associated with the hydrogen generating reactions. Metals such as aluminum, steel and stainless steel, ceramics, and high temperature resistant polymers such as polyphenylene sulfide, acrylonitrile butadiene styrene, polyetheretherketone, polyetherimide, polyoxybenzylmethylenglycol anhydride (Bakelite®), epoxies, phenolics, diallyl phthalate and melamine may be suitable for the housing. In some embodiments the housing may be made from a material that is a poor thermal conductor (e.g., less than 10 watts/meter·Kelvin), and preferably less than 1 watt/meter·Kelvin) to protect the fuel cell system to which the hydrogen generator supplies hydrogen, and/or to protect the user from heat produced within the hydrogen generator. If desired, thermal insulation may be added to the hydrogen generator, within the housing, around the housing or elsewhere in the fuel cell system or the device. In addition to or instead of adding thermal insulation, a vacuum can be provided in a hollow space in one or more walls of the holder to provide thermal insulation. Thermal insulation can protect components of the hydrogen generator, other parts of the fuel cell system, the device with which the fuel cell system is being used, and/or the user.

The hydrogen generator may include an exhaust for venting the hydrogen gas released. The exhaust may be coupled to a hydrogen flow path that interfaces with the fuel cell. One or more filters or purification devices may be provided in the hydrogen flow path to remove solid or gaseous byproducts (such as fuel cell poisons) and/or unused hydrogen containing material from the hydrogen gas. Examples of suitable filter materials include silica, silicon dioxide, silicon nitrides, silicon carbide, silica aerogel, alumina, aluminum oxide, glass, glass wool, mineral wool, cellular glass, microfiber glass, perlite and polymers such as polytetrafluoroethylenes, polyimides and epoxy-amine composites, as well as suitable gas purification units (such as ion exchange resins).

Figure 1:
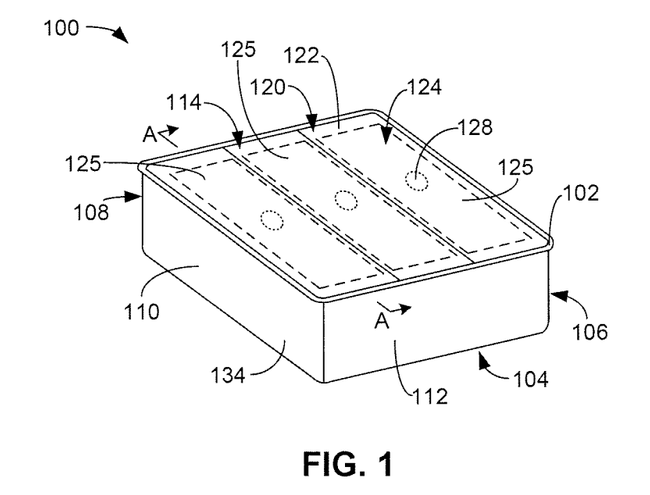
FIG. 1 is a perspective view showing an exemplary fuel cartridge.
Figure 2:
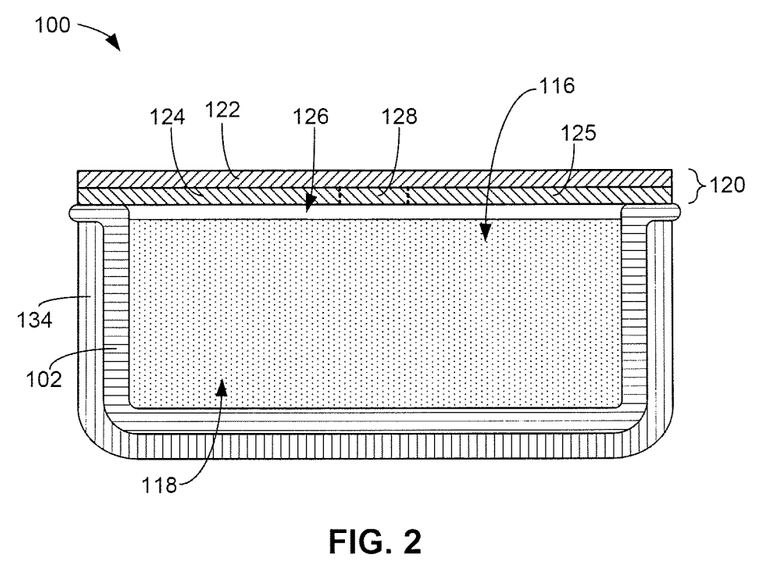
FIG. 2 is a cross-sectional view showing the fuel cartridge of FIG. 1, as viewed along line A-A.
Figure 3:
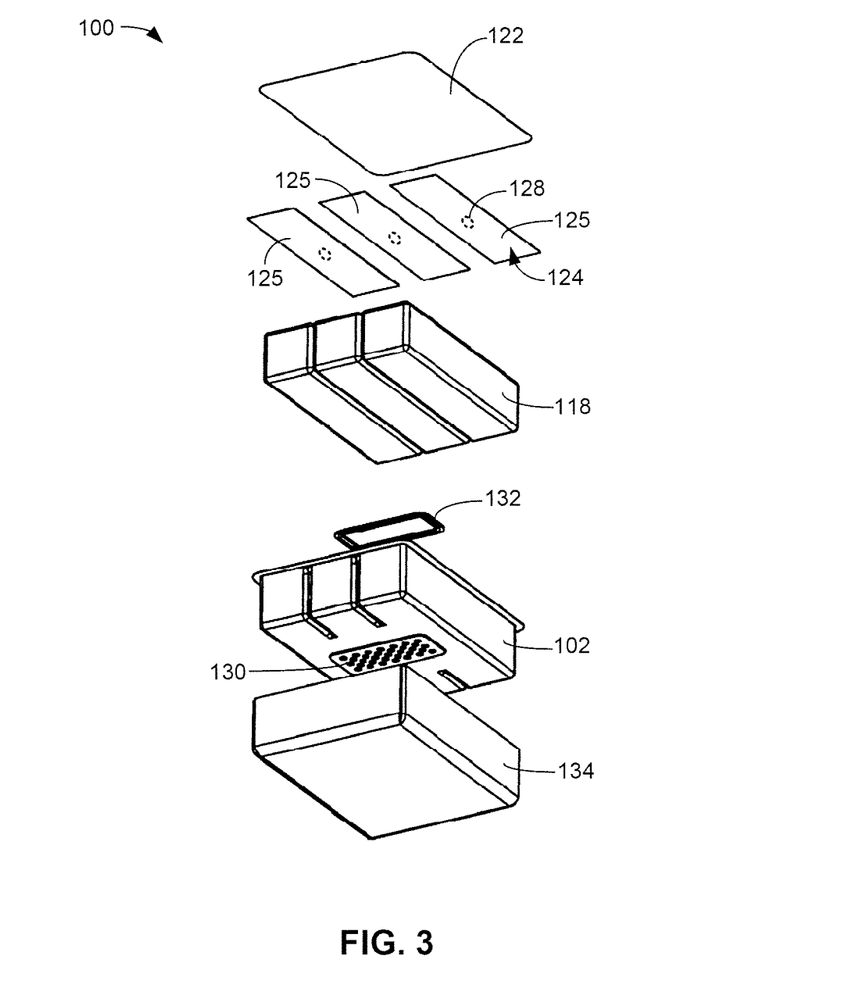
FIG. 3 is an exploded perspective view showing the fuel cartridge of FIG. 1.

Referring now in detail to the drawings and initially to FIGS. 1 to 3, an exemplary embodiment of a fuel cartridge is shown generally at 100. The fuel cartridge 100 can be removably inserted into a hydrogen generator (e.g., as described below). The fuel cartridge 100 includes a container 102 having a base surface 104, side surfaces 106, 108, 110, 112, and an open portion 114. The container 102 defines an interior volume 116 having one or more compartments within which a fuel composition 118 may be contained. A fuel composition 118 is disposed within the interior volume 116 of the container 102. The fuel composition 118 may include one or more hydrogen containing materials that can release hydrogen gas (e.g., via a thermal decomposition reaction) when heated. Reactants that can undergo thermal decomposition reactions to produce hydrogen gas are desirable because they generally produce a relatively high volume of hydrogen gas on a volumetric basis.

FIGS. 1 to 3 show an embodiment in which the fuel composition 118 is segregated into multiple compartments. With specific reference to FIG. 3, the fuel cartridge 100 includes a hydrogen gas outlet 130. The hydrogen gas outlet 130 allows the hydrogen gas to be removed from the container 102. The fuel cartridge 100 additionally includes a filter 132 at the outlet 130. The fuel cartridge 100 includes a thermal insulation layer 134. The thermal insulation around a portion of the container 102. In the embodiment shown in FIGS. 1-3, a thermal insulation layer 134 surrounds the side surfaces 106, 108, 110, 112 and the base surface 104 of the container, but does not surround the open portion 114 of the container 102.

The container 102 includes an open portion 114 covered by a laminate 120 that seals the container. The laminate 120 includes a substrate layer 122 and a conductor layer 124.

The conductor layer 124 includes an array of conductor sections, as shown in FIGS. 1 to 3, where the conductor layer 124 includes conductor sections 125 arranged in a single longitudinal row, extending parallel to a longitudinal axis of the substrate layer 122. The conductor sections 125 are generally arranged such that at least one conductor section 125 is aligned with each segmented portion of the fuel composition 118.

The conductor layer 124 includes a plurality of preformed portions 128. The preformed portions 128 of the conductor layer are configured such that they will separate from the remainder of the conductor layer 124 due to a force applied thereto in a direction perpendicular to the major surface of the conductor layer 124. Once disconnected, the preformed portion of the conductor layer is configured to contact the surface of the fuel composition 118 and conduct heat from a heater assembly of the hydrogen generator to the fuel composition 118, thereby providing for a point-source heating at the surface of the fuel composition 118.

Each conductor section includes a preformed portion, as shown in FIGS. 1 to 3. The preformed portion 128 of the conductor layer 124 is arranged near the center of the fuel composition surface proximate the conductor layer 124 to allow the heat conducted by the preformed portion 128 to efficiently spread throughout the extent of the fuel composition 118.

A gap 126 is present between the laminate 120 and the fuel composition 118. The gap 126 allows for the preformed portion 128 to separate from the remainder of the conductor layer 124 when pushed by a punch.

Figure 4:
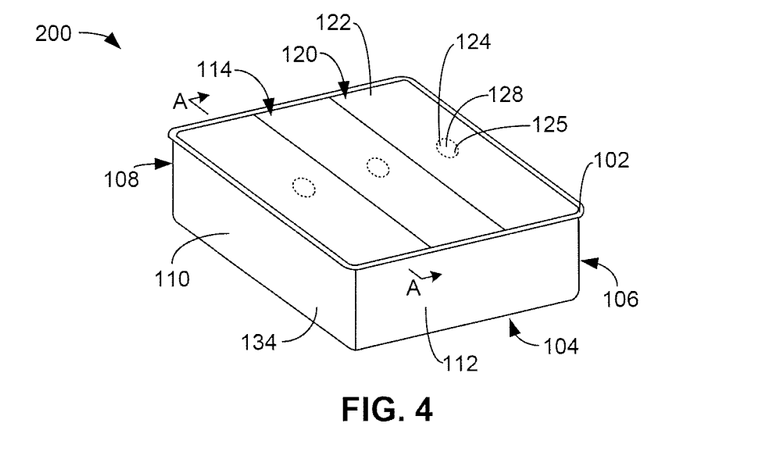
FIG. 4 is a perspective view showing another exemplary fuel cartridge.
Figure 5:
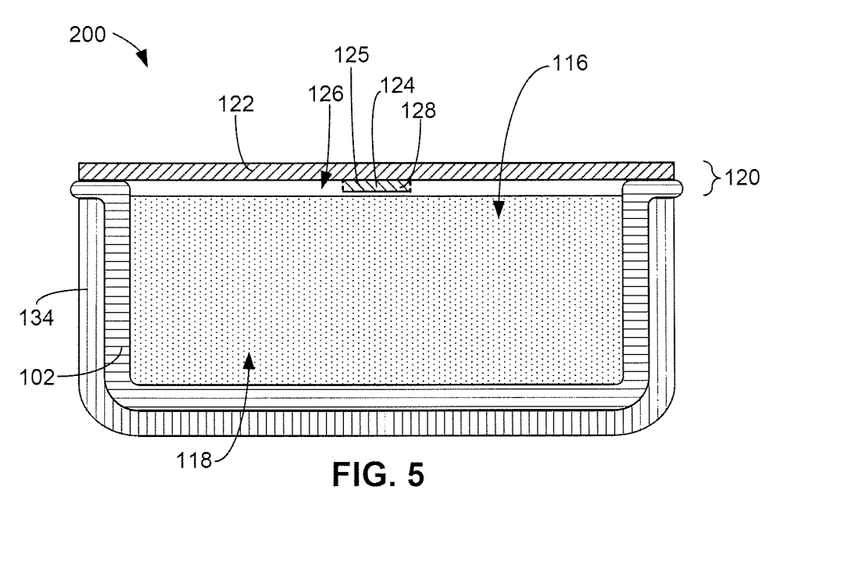
FIG. 5 is a cross-sectional view showing the fuel cartridge of FIG. 4 as viewed along line A-A.
Figure 6:
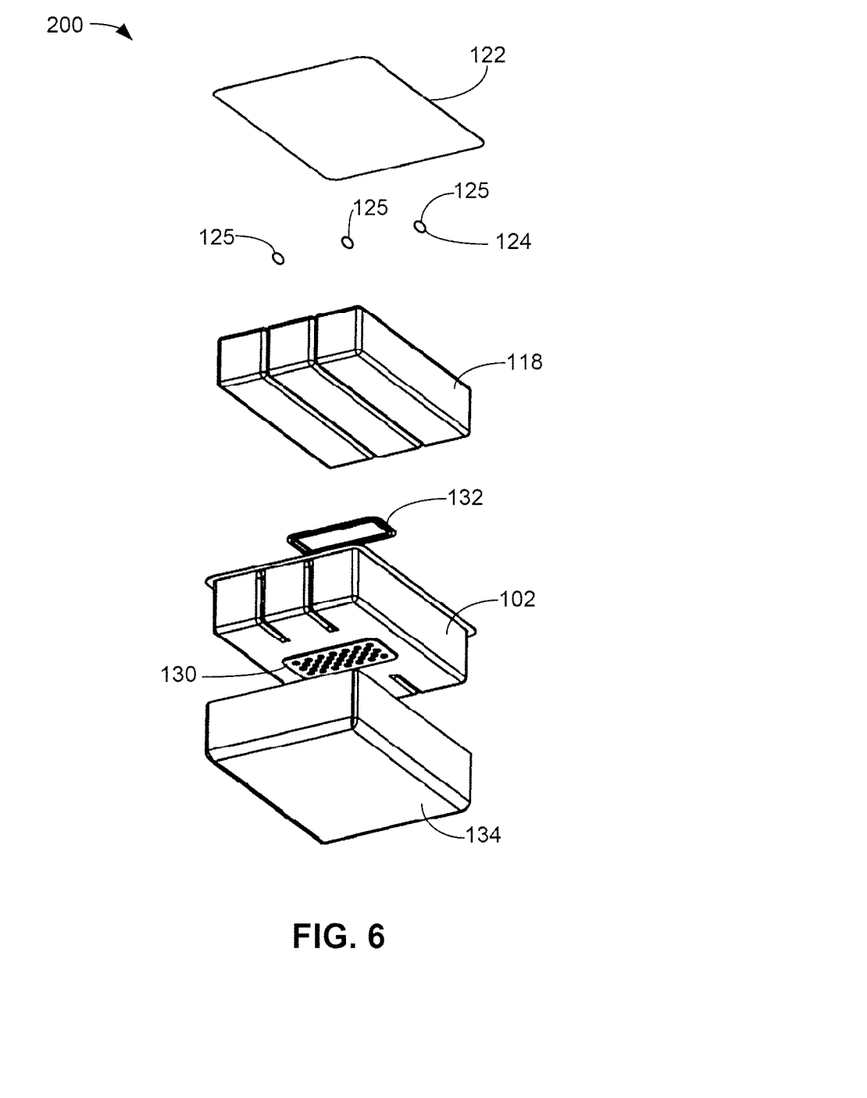
FIG. 6 is an exploded perspective view showing the fuel cartridge of FIG. 4.

FIGS. 4 to 6 show another exemplary embodiment of a fuel cartridge at 200. The fuel cartridge 200 is similar to the above-referenced fuel cartridge 100, except that the conductor layer 124 of the laminate 120 differs from that shown in FIGS. 1 to 3. Consequently, the same reference numerals used for the fuel cartridge 100 are used to denote features corresponding to similar features in the fuel cartridge 200. In addition, the above description of the corresponding features of the fuel cartridge 100 is equally applicable to the fuel cartridge 200, except as noted below.

In the embodiment shown in FIGS. 4 to 6, the conductor layer 124 of the laminate 120 is defined by the preformed portions 128 (the entire conductor layer 124 consists of the preformed portions 128. In accordance with the embodiment shown in FIGS. 4-6, each preformed portion 128 is associated with a respective segregated portion of the fuel composition 118. Each preformed portion 128 is configured to contact the surface of the fuel composition 118 due to a force applied thereto in a direction perpendicular to the major surface of the conductor layer 124 by a punch, and conduct heat from a heater assembly of the hydrogen generator to the fuel composition 118, without having to disconnect from a remainder of the conductor layer 124.

Figure 7:
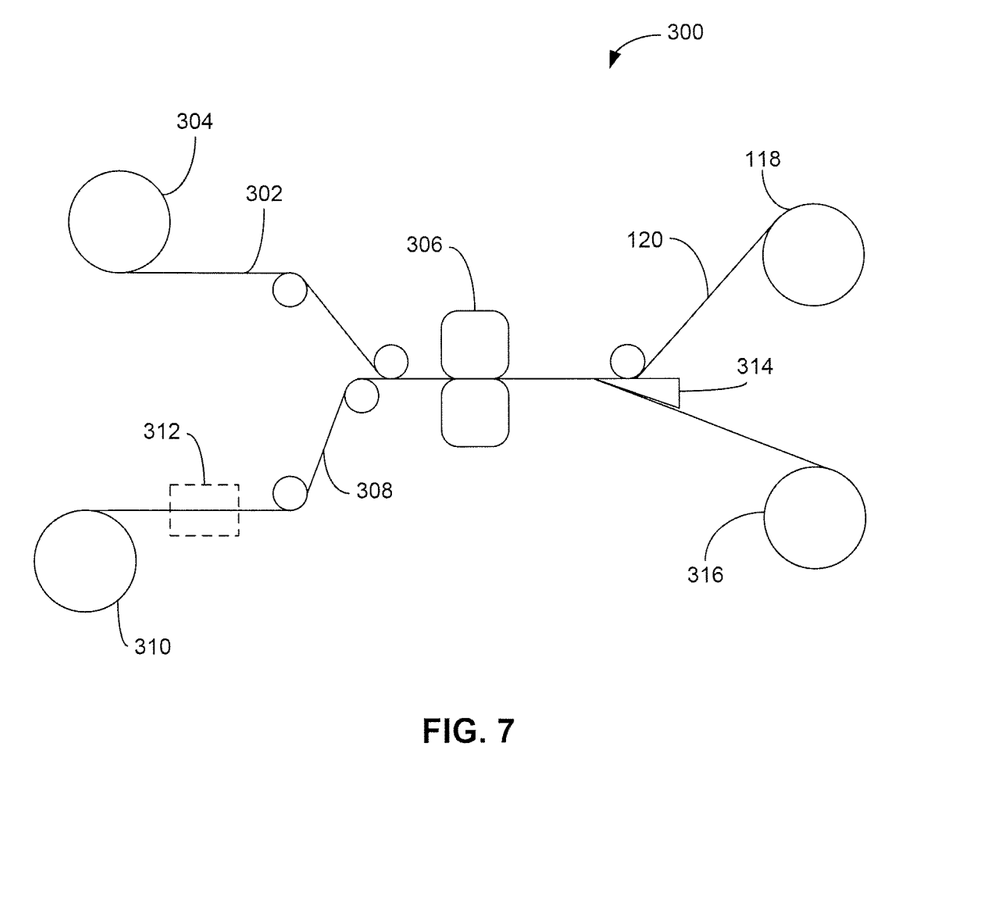
FIG. 7 is a schematic view of an exemplary process for forming the laminate.

An exemplary embodiment of a roll-to-roll process for making a laminate 120 for use in connection with the fuel cartridge 100, 200 is shown schematically in FIG. 7 at 300. A substrate strip 302 in roll form is unwound and fed from a feed reel 304 to a bonder 306. A conductor strip 308 is unwound and fed from a feed reel 310 to a machining apparatus 312, where the conductor strip 308 is machined to produce conductor sections 125 connected to at least a portion of the remainder of the conductor strip 308. The conductor sections 125 are formed by making cuts in the conductor strip 308. The preformed portion 128 of each conductor strip 125 is also formed by the machining apparatus 312. The substrate strip 302 and the conductor strip 308 are then aligned with each other, and the conductor sections 125 are secured to the substrate strip 302 by a bonder 306. The portion of the conductor strip that is not the conductor portions 125 is then separated from the bonded laminate 120 by a web separator 314 and collected in a take-up reel 316. The laminate 120 is collected using a take-up reel 318.

Figure 8:
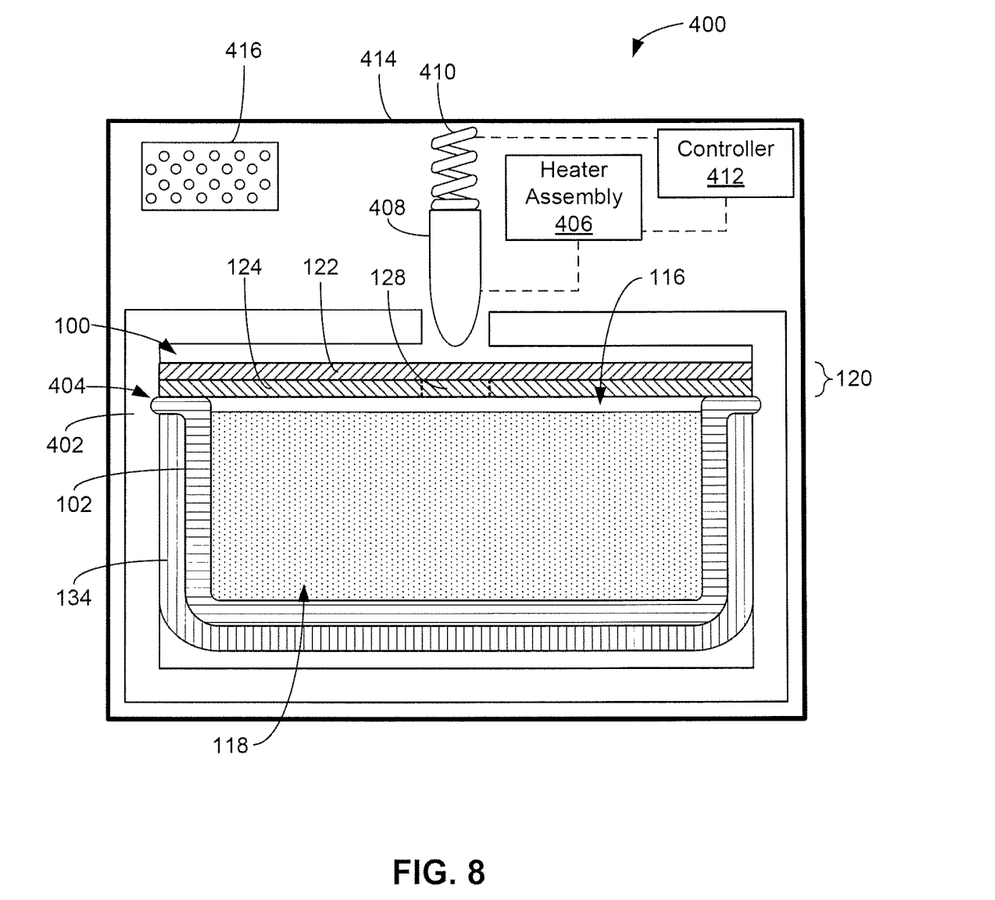
FIGS. 8 and 9 are schematic views showing parts of an exemplary hydrogen generator including the fuel cartridge of FIG. 1, as viewed along line A-A.

The fuel cartridge 100, 200 is formed by providing the container 102, inserting the fuel composition 118 into the interior volume 116 of the container 102, and sealing the container 102 using the laminate 102. The laminate is aligned with the open portion 114 of the container 102 such that the conductor section 125 may be positioned over the fuel composition 118. A segment of the laminate is used to close or seal the container. Referring now to FIG. 8, an exemplary hydrogen generator is shown generally at 400. The hydrogen generator 400 includes a holder 402. While the example shown in FIG. 8 includes the fuel cartridge 100 as described above with respect to FIGS. 1-3 retained in the holder 402, it will be understood that in other embodiments, the fuel cartridge 200 or one or more other suitable fuel cartridges may be retained in the holder 402.

The holder 402 includes features for aligning the each fuel cartridge 100, 200 in a particular orientation. The walls of the holder include one or more surface features 404 (projections) that cooperate with features of the fuel cartridge 100, 200 to permit insertion of the fuel cartridge into the holder in only the desired orientation. The projections 404 shown in FIG. 8, allow the fuel cartridge 100 to slide in an out of the holder 402 in a direction perpendicular to the figure. The projections 404 may make it possible for the fuel cartridge 100 to be inserted with the laminate 120 proximate the punch.

Figure 9:
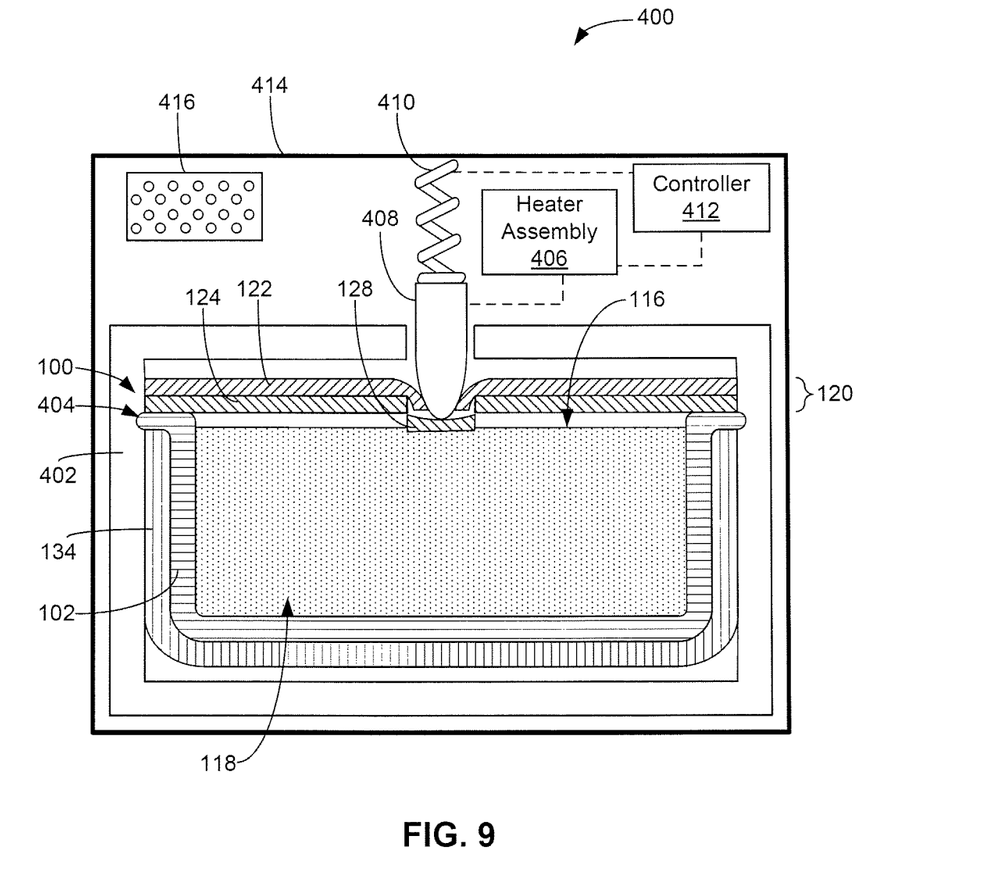

The hydrogen generator 400 includes at least one heater assembly 406. The heater assembly 406 is configured to provide heat to the fuel composition 118 of the fuel cartridge 100, 200 to initiate a release of hydrogen gas. The hydrogen generator 400 includes at least one punch. Each punch is configured to move between a retracted state and a puncture state. The punch is coupled to a biasing member 410 for moving the punch between states. FIG. 8 shows the punch 408 in the retracted state. As shown, a fuel cartridge 100 has been inserted into the hydrogen generating apparatus 400. FIG. 9 shows the punch 408 in the puncture state. The laminate 120 has been punctured by moving the punch 408 from the retracted state to the puncture state. As shown, the punch 408 is configured to puncture the substrate layer 122, detach the preformed portion 128 from the remainder of the conductor layer 124, and bring the preformed portion 128 into contact with the surface of the fuel composition 118.

Each punch 408 is thermally coupled to the heater assembly 406 (e.g., via the heating element). In the puncture state, such as that shown in FIG. 9, a thermally-conductive path is provided from the heater assembly 406 to the fuel composition 118 contained within the fuel cartridge 100. Heat produced by the heating element is conducted through the punch 408 and preformed portion 128 of the conductor layer 124, to the surface of the fuel composition 118. The punctured laminate 120 does not prevent residual hydrogen from escaping therethrough, but acts as a barrier to prevent particulate matter from escaping from the container 102.

Figure 10A:
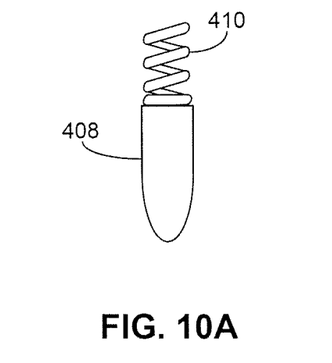
FIGS. 10A-10D are schematic views showing exemplary punches.
Figure 10B:
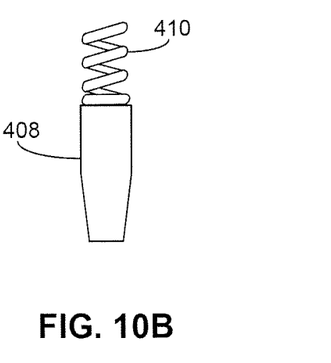
Figure 10C:
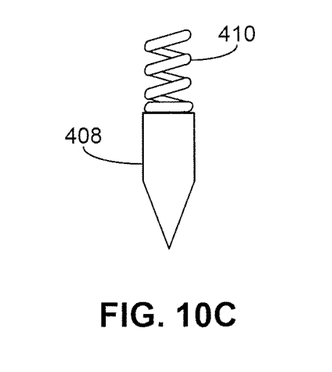
Figure 10D:
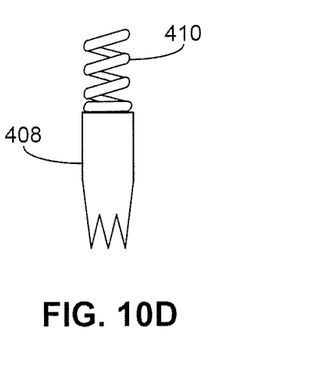

The punch 408 may have any suitable shape for puncturing the substrate layer 122 and detach the preformed portion 128 from the remainder of the conductor layer 124. FIGS. 10A-D show exemplary embodiments of the punch 408. FIG. 10A shows the punch as having a bullnose shape. FIG. 10B shows the punch 408 as having a tapered shape. FIG. 10C shows the punch 408 as having a pointed shape. FIG. 10D shows the punch 408 as having multi-pointed shape.

The hydrogen generator 400 includes a controller 412 for controlling the heater assembly 406 and/or the biasing member 410 for moving the punch 408. The controller 412 may also be coupled to the fuel cell, as described above.

The hydrogen generator includes a housing 414 in which the components of the hydrogen generator are disposed. The housing 414 may be closable (e.g., via a door) to retain the fuel cartridge within the holder 402, and the housing 414 may be sealable to contain the generated hydrogen gas and exclude gases from the outside environment.

The hydrogen generator 400 includes an exhaust 416 for venting the hydrogen gas released. The exhaust 416 may be coupled to a hydrogen flow path that interfaces with the fuel cell. Although not specifically shown, in some embodiments, one or more filters or purification devices may be provided in the hydrogen flow path to remove solid or gaseous byproducts and/or unreacted reactant from the hydrogen gas.

Although the present disclosure has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the present disclosure. In addition, while a particular feature of the present disclosure may have been described above with respect to only one or more of several illustrated embodiments, such feature may be combined with one or more other features of the other embodiments, as may be desired and advantageous for any given or particular application.

What is claimed is:
1. A method of generating hydrogen gas, comprising:
inserting a fuel cartridge into a hydrogen generator, the hydrogen generator comprising a housing that houses a holder configured to retain the fuel cartridge, a heater assembly, and a punch thermally coupled to the heater assembly, and the fuel cartridge comprising:
a container defining an interior volume and comprising an open portion;
a fuel composition disposed within the interior volume of the container, the fuel composition comprising a hydrogen containing material configured to release hydrogen gas when heated; and
a multi-layer package material at the open portion of the container and enclosing the fuel composition within the container;
puncturing the multi-layer package material by moving the punch from a retracted state to a puncture state, wherein the puncture state of the punch provides a heat conductive path from the heat source to the surface of the fuel composition through the punch; and
applying heat to the fuel composition through the punch to release hydrogen gas from the hydrogen generating material.
2. The method of claim 1, wherein the multi-layer package material comprises:

a conductor layer proximate the fuel composition, a portion of the conductor layer being a preformed portion; and, a polymer layer distal the fuel composition.

3. The method of claim 2, wherein the step of puncturing the multi-layer package material comprises puncturing the polymer layer, separating the preformed portion of the conductor layer from the remainder of the conductor layer, and bringing the preformed portion of the conductor layer into contact with the fuel composition.

4. The method of claim 2, wherein the step of puncturing the multi-layer package material comprises puncturing the polymer layer and bringing the preformed portion of the metal layer into contact with the fuel composition.

5. The method of claim 1, wherein
the conductor layer comprises at least one of aluminum, copper, stainless steel, steel, or nickel; and,
the polymer layer comprises polyether ether keytone.

6. The method of claim 5, wherein the fuel composition comprises multiple segregated portions disposed within the interior volume of the container, the conductor layer comprises multiple preformed portions, each preformed portion adjacent a respective segregated portion of the fuel composition, and the hydrogen generator comprises multiple punches, each punch arranged so as to be adjacent a respective segregated portion of a fuel composition within the fuel cartridge when the fuel cartridge is retained by the holder, and,
wherein the step of puncturing the multi-layer package material comprises controlling one of the multiple punches to puncture one of the respective preformed portions.

* * * * *